US012030208B2

(12) United States Patent
Moessnang et al.

(10) Patent No.: US 12,030,208 B2
(45) Date of Patent: Jul. 9, 2024

(54) CUTTING DEVICE AND METHOD FOR MANUFACTURING A CUTTING PUNCH

(71) Applicant: MULTIVAC SEPP HAGGENMUELLER SE & CO. KG, Wolfertschwenden (DE)

(72) Inventors: Konrad Moessnang, Kempten (DE); Dominik Jacobi, Kempten (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 27 days.

(21) Appl. No.: 17/492,223

(22) Filed: Oct. 1, 2021

(65) Prior Publication Data

US 2022/0105655 A1 Apr. 7, 2022

(30) Foreign Application Priority Data

Oct. 1, 2020 (DE) ......................... 102020125688.4

(51) Int. Cl.
*B26F 1/44* (2006.01)
*B21D 28/34* (2006.01)

(52) U.S. Cl.
CPC ................ *B26F 1/44* (2013.01); *B21D 28/34* (2013.01); *B26F 2001/4436* (2013.01); *B26F 2001/4472* (2013.01)

(58) Field of Classification Search
CPC ........ B26F 1/14; B26F 1/44; B26F 2001/447; B26F 2001/448; B26D 28/34
USPC ............................................................ 83/634
See application file for complete search history.

(56) References Cited

U.S. PATENT DOCUMENTS

| | | | | |
|---|---|---|---|---|
| 376,136 A * | 1/1888 | Burrowes | A01G 3/06 | 30/103 |
| 2,122,368 A * | 6/1938 | Engler | B26F 1/44 | 83/16 |
| 2,936,665 A * | 5/1960 | Naffin | B26D 3/10 | 83/636 |
| 5,469,923 A * | 11/1995 | Visser | A01B 1/165 | 294/50.6 |

(Continued)

FOREIGN PATENT DOCUMENTS

| | | |
|---|---|---|
| DE | 11 57 466 A | 11/1963 |
| DE | 71 32 214 U | 12/1971 |

(Continued)

OTHER PUBLICATIONS

German Search Report (with Partial English Machine Translation), Dated Oct. 4, 2021, Application No. 10 2020 125 688.4, Applicant MULTIVAC Sepp Haggenmueller SE & Co. KG, 7 Pages.

(Continued)

*Primary Examiner* — Jennifer S Matthews
(74) *Attorney, Agent, or Firm* — Brooks Kushman P.C.

(57) ABSTRACT

The disclosure relates to a cutting device which is adapted for cutting substantially round packaging corners from a film web, wherein the cutting device has at least one cutting tool comprising a cutting punch which has at its outside at least one concavity provided for forming a cutting edge of the cutting punch. According to the disclosure, the cutting edge has a cutting contour extending both transversely and longitudinally along the cutting punch. The disclosure further relates to a method for manufacturing a cutting punch.

12 Claims, 13 Drawing Sheets

(56) References Cited

U.S. PATENT DOCUMENTS

| | | | | |
|---|---|---|---|---|
| 5,893,313 A * | 4/1999 | Mori | B26D 3/10<br>83/684 |
| 10,766,655 B2 | 9/2020 | Ehrmann et al. | |

FOREIGN PATENT DOCUMENTS

| | | | | |
|---|---|---|---|---|
| DE | 202 16 772 U1 | 3/2004 | |
| DE | 10 2005 000 786 A1 | 7/2006 | |
| EP | 1762349 A2 * | 3/2007 | B26F 1/14 |
| EP | 2 311 611 A2 | 4/2011 | |
| EP | 3 109 017 B1 | 11/2017 | |
| GB | 2 587 057 A | 3/2021 | |
| JP | 2009113051 A * | 5/2009 | |
| KR | 101852613 B1 * | 6/2018 | |
| WO | WO-2017010986 A1 * | 1/2017 | B23D 15/002 |
| WO | WO-2017010987 A1 * | 1/2017 | B26D 1/065 |
| WO | WO-2017074293 A1 * | 5/2017 | B26F 1/12 |
| WO | WO-2018207137 A1 * | 11/2018 | A01K 11/003 |

OTHER PUBLICATIONS

European Search Report (with English Machine Translation), Dated Feb. 22, 2022, Application No. 21199898.4-1016, Applicant MULTIVAC Sepp Haggenmueller SE & Co. KG, 12 Pages.

* cited by examiner

CUTTING DEVICE AND METHOD FOR MANUFACTURING A CUTTING PUNCH

CROSS-REFERENCE TO RELATED APPLICATIONS

This application claims foreign priority benefits under 35 U.S.C. § 119(a)-(d) to German patent application number DE 10 2020 125 688.4, filed Oct. 1, 2020, which is incorporated by reference in its entirety.

TECHNICAL FIELD

The present disclosure relates to a cutting device, and to a method of manufacturing a cutting punch.

BACKGROUND

A cutting device for punching round packaging corners is known from DE 202 16 772 U1. Star-shaped cutting punches are used on this cutting device, which together with corresponding star-shaped recesses are available as a punching tool. During the punching process, the contour of the shape to be punched out is simultaneously scored from above and below by the cutting edges of the recesses and the cutting punch and finally sheared off. The cutting punch has a two-dimensional cutting contour which corresponds to the shape to be punched out.

EP 3 109 017 B1 discloses a thermoforming packaging machine whose transverse cutting device is configured as a film punch for cutting a film web in a direction transverse to the transport direction between adjacent troughs.

According to the previous publications, packaging, in particular round packaging corners, has so far been punched or produced by means of a squeeze cut. The problem is that high manufacturing costs incur in the production of punching tools due to their high manufacturing accuracy. In addition, the operation of punching tools results in extremely high punching forces which have to be absorbed by means of a complex construction. This also involves increased energy consumption on the packaging machine. In addition, a considerable amount of waste material can be produced during the punching process, for example in the form of a residual grid which has to be wound up at the exit of a thermoforming packaging machine with a relatively large volume and then disposed of at high cost. Furthermore, the punching of complete film cutouts can result in increased film consumption due to the complex structure and geometry of punching tools.

The underlying problem to be solved by the disclosure is to provide a cutting device and a method for manufacturing a cutting punch, by which the above-mentioned disadvantages described in connection with the state of the art can at least be reduced.

Preferred further developments of the disclosure are provided by the respective subject matter of the dependent claims.

SUMMARY

The disclosure relates to a cutting device adapted for cutting substantially round packaging corners from a film web, wherein the cutting device has at least one cutting tool comprising a cutting punch having on its outside at least one concavity provided for forming a cutting edge of the cutting punch.

According to the disclosure, the cutting edge has a cutting contour extending both transversely and longitudinally along the cutting punch. This means that the cutting contour runs three-dimensionally along the body of the cutting punch, i.e., not just two-dimensionally parallel to the cutting plane as in known punching punches. The cutting edge according to the disclosure cuts through the film web with increasing penetration depth (i.e., advancing in the cutting or film plane) until the film cut is completely achieved. The cutting edge can be pulled through the film web by means of comparatively low cutting forces.

In particular, the cutting edge in the fixed state of the cutting punch on the cutting device has a curved cutting contour when viewed in both the horizontal and vertical projection planes. Accordingly, the cutting edge used in the disclosure differs from cutting edges typically formed on cutting punches of punching tools by a cutting contour whose course deviates from the film shape to be cut out. This allows the cutting edge according to the disclosure not to punch through the film web with the entire cutting edge at once during the cutting process, but rather, for example, initially to a certain extent in a punctiform manner, and with increasing penetration depth along its cutting contour, to pull the film web and cut it.

In other words, the cutting edge according to the disclosure favors a cutting process which progresses increasingly along its three-dimensional cutting contour in the cutting or film plane, which on the one hand can easily be carried out at a high cutting speed to increase productivity, and on the other hand requires lower cutting forces compared to known abrupt punching processes. Overall, this can also significantly improve the energy balance of the cutting device. By means of the cutting process made possible by the disclosure, which continues gradually along the cutting edge, it is also easier to cut film cutouts of any shape completely free, because the film cutouts can be prevented from folding away around a residual joint.

It is also preferred in the disclosure that, in contrast to conventional punching or shear cutting, no close-tolerance recess and also no close-tolerance hold-down device are required. This reduces manufacturing costs. Thereby, the possibility of a compact structure also arises for the cutting device. Furthermore, this has the consequence that complete film cutouts can be produced from the film web with a reduced material input by means of the cutting device according to the disclosure. As a result, both a weight-reduced residual film grid and improved handling of the same are achieved.

Preferably, the cutting edge has a star-shaped cutting contour projected at least partially in a cutting plane. This geometry favors complete free cutting of a film cutout because, together with the cutting edge according to the disclosure, it reliably cuts through respective residual joints completely at the cutting lines running essentially tapered towards each other thereon, i.e., at star tips or in notches located in between. This is not always perfectly possible with known punches, on which there is only a two-dimensional cutting edge with a star-shaped cutting contour, because a residual film joint can sometimes not be completely cut through because the film cutout deviates towards the film web instead of being cut out completely. This happens above all with known punching dies if the cutting speed is set too low for them or their two-dimensional cutting edge is blunted. In contrast, the cutting edge contour on the cutting punch of the present disclosure, which is both three-dimensional and star-shaped, can have a positive influence on the ability to cut the film material completely free, even if the cutting edge sharpness is low.

A preferred embodiment provides that the cutting punch has several tips which are formed both in the transverse and longitudinal extension of the cutting punch. The cutting punch thus has a dome-shaped cutting head, the tips of which taper both in the transverse extension and in the longitudinal extension of the cutting punch. This allows the cutting punch to increasingly penetrate the film web with the tips first, with little effort, in order to cut free a complete film cutout by means of the cutting path described above, which increasingly pulls through the film web. Due to the tips, the cutting punch can dip into the film web with increasing cross-section. The result is that, with reduced force, the respective flanks of the tips dip into the film web down to the notches between them, resulting in low stresses within the film web, which favors a precise film cutout.

One variant provides that along the cutting contour of the cutting edge, the tips formed in the longitudinal extension of the cutting punch correspond to the tips formed in the transverse extension of the cutting punch. In this case, the longitudinal tips converge with the transverse tips, resulting in a molded body that is easy to produce. In the horizontal projection plane, this would result in a star-shaped cutting contour.

In accordance with one embodiment, the respective tips may have a comparable grind thickness or inner curvature. An inner contour created at the tips could, for example, include an angle of approximately 20° to 40° towards the cutting edge. Even more bluntly shaped cutting edges can still lead to excellent cutting results due to the varying height of the cutting contour.

An expedient variant provides that along the cutting contour of the cutting edge, the tips formed in the longitudinal extension of the cutting punch are configured between the tips formed in the transverse extension of the cutting punch. Viewed in a horizontal projection plane, the cutting punch would thus still have a star-shaped cutting line, as would be the case with the above-described converging longitudinal and transverse tips. However, in contrast to the above variant, there are now external transverse tips and internal longitudinal tips. This can be advantageous because it allows the cutting path to be generated from the inner longitudinal tips outward to the outer transverse tips so that an adjacent cutting knife directly adjoining the cutting contour on the outside can continue cutting smoothly.

It is preferred if the cutting punch has at least one depression which, superimposed on the first concavity, forms the cutting edge. In this way, the first concavity formed on the cutting punch together with the depression on the cutting punch can generate a three-dimensional cutting contour for the cutting edge, which provides a cutting contour that extends out of the cutting plane.

In particular, the depression can be configured conically in the longitudinal direction of the cutting punch. Such a geometry is easy to manufacture and is particularly favorable for forming the tips described above. In addition, the conical depression, together with the concavity formed on the cutting punch, favors the production of a sharp cutting edge.

A preferred embodiment provides that the depression is at least partially in the form of a truncated cone with respect to a longitudinal axis of the cutting punch. In terms of manufacturing technology, this is easy to realize because a simple CNC machine can be used for this purpose, which can produce the cutting punch in just a few steps and without multi-axis operation.

The cutting punch is particularly robust and wear-resistant if it is configured integrally. In particular, the cutting punch can be manufactured from a single workpiece blank by means of a metal-cutting manufacturing process. For example, it would be conceivable to manufacture the cutting punch using a CNC milling machine.

Preferably, the cutting punch has four concavities on its outside. These can be formed on the circumference of the cutting punch and opposite each other so that together they form a star shape.

Particularly preferred, the cutting device can be used on a thermoform packaging machine which has a forming station, a sealing station, a transverse cutting station and a longitudinal cutting station in a transport direction. On the thermoform packaging machine, the cutting device can be used as a tool module at the transverse cutting station in order to cut out essentially round packaging corners from a film web fed to the transverse cutting station and consisting of sealed packaging troughs.

The disclosure also relates to a method for manufacturing a cutting punch which is used on a cutting device for producing round packaging corners. The method according to the disclosure provides that at least one concavity is produced on an outside of a workpiece blank, wherein a depression is produced on another side of the workpiece blank such that this depression, superimposed on the concavity, forms a cutting edge of the cutting punch with a cutting contour extending both transversely and longitudinally of the cutting punch.

A cutting punch manufactured in such a way has a cutting edge with a three-dimensional cutting contour, which cuts an essentially round film cutout from a film web with increasing penetration depth. This allows a reduced use of force as well as a complete film cutout without any problems. In addition, excellent high cutting speeds can be achieved, which increases the overall productivity of the packaging machine on which the cutting punch is used.

The method according to the disclosure can easily be carried out by means of a single-axis CNC machine. This can be a CNC milling machine which is configured without multi-axis operation.

A preferred variant provides that a cylindrical milling tool is used to produce the concavity and an at least partially conical, parabolic or cylindrical milling tool is used to produce the depression. Thus, a cost-effective production can be achieved. It would even be conceivable for the concavity and the depression to be produced using the same milling tool.

According to an embodiment, the cutting tool for the concavity and the cutting tool for the depression produce the cutting edge of the cutting punch by means of an at least temporarily simultaneously controlled feed motion or are used in successive, separate work steps. These variants can be carried out by means of the same CNC machine.

It is preferred if the cutting punch is cured at least along its cutting edge by means of a thermal method. Wear resistance can thus be increased.

BRIEF DESCRIPTION OF THE DRAWINGS

In the following, preferred embodiments of the disclosure are explained in more detail with reference to drawings.

Similar components are identified by the same reference signs throughout the Figures.

DETAILED DESCRIPTION

Figure 1:
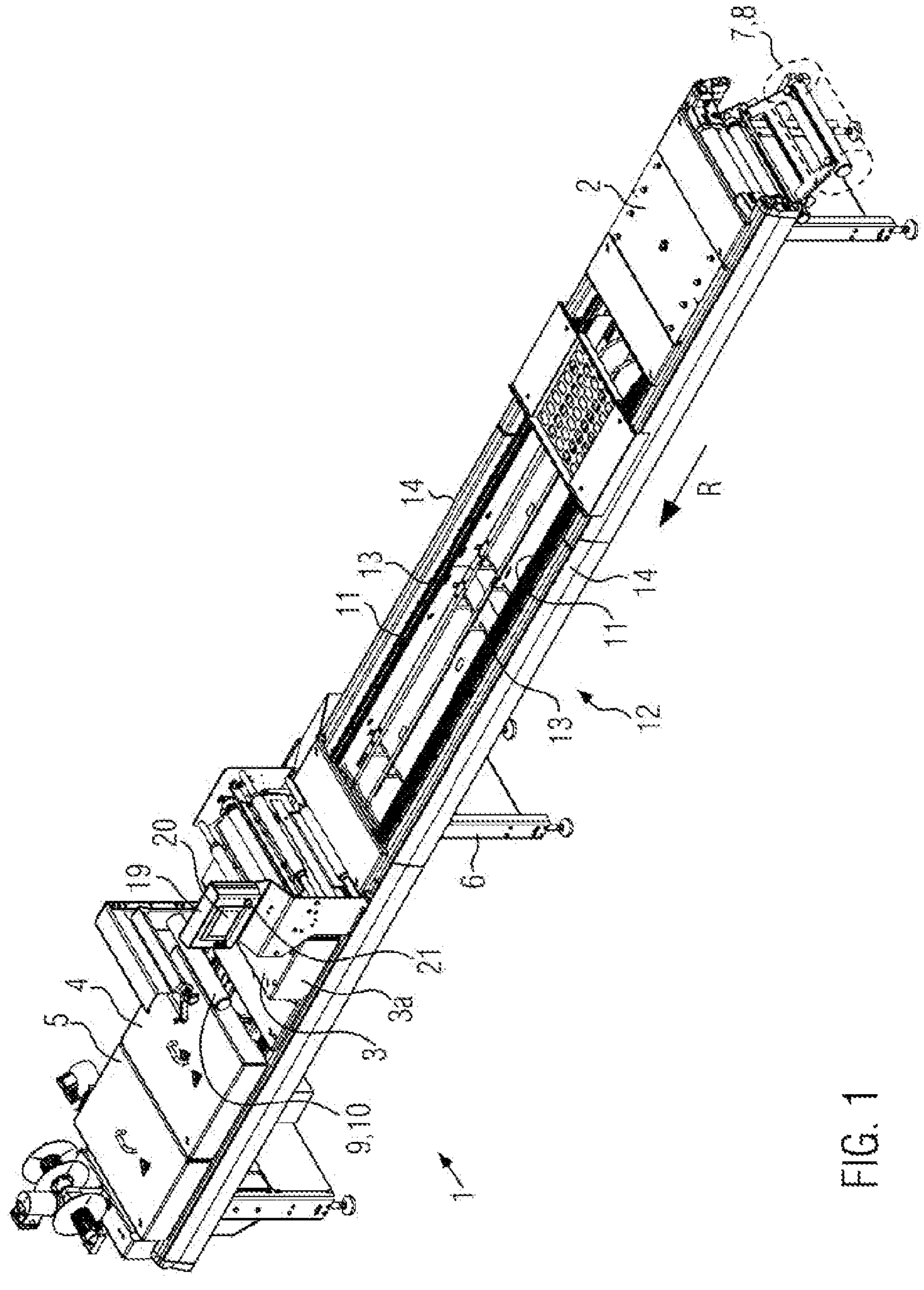
FIG. 1 shows a perspective view of a thermoforming packaging machine.

FIG. 1 shows a perspective view of an intermittently operating thermoforming packaging machine 1. This thermoforming packaging machine 1 has a forming station 2, a sealing station 3, a transverse cutting device 4 and a longitudinal cutting device 5, which are arranged in this order in a transport direction R on a machine frame 6. On the input side, a feed roller 7 is located on the machine frame 6, from which a lower film 8 is drawn off. Furthermore, the thermoforming packaging machine 1 has a transport chain 11 which grips the lower sheet 8 and transports it further in the transport direction R per main working cycle, in particular transport chains or clamp chains 11 arranged on both sides.

In the embodiment shown, the forming station 2 is configured as a deep-drawing station in which troughs are formed in the lower film 8 by deep-drawing, for example by means of compressed air and/or vacuum. The forming station 2 can be configured such that several troughs are formed next to each other in the direction perpendicular to the transport direction R. A filling path 12 is provided downstream of the forming station 2 in the transport direction R, in which the troughs formed in the lower film 8 are filled with products.

The sealing station 3 has a hermetically sealable chamber 3*a* in which the atmosphere in the troughs can be replaced, e.g., evacuated and/or by gas purging, with an exchange gas or with a gas mixture before sealing with the upper film 10 dispensed from an upper film receptacle 9.

The transverse cutting device 4 is adapted to cut a film web F fed into it, consisting of the lower film 8 and the upper film 10 sealed therewith, in a direction transverse to the transport direction R between adjacent troughs. The transverse cutting device 4 operates such that the lower film 8 is not cut across its entire width, but is not cut through at least in an edge region. This allows controlled onward transport through the transport chain 11.

The longitudinal cutting device 5 can be configured as a knife arrangement with which the film web F, i.e., the lower film 8 and the upper film 10, are cut between adjacent troughs and at the lateral edge of the lower film 8 in the transport direction R so that separated packages are present downstream of the longitudinal cutting device 5.

The right and left transport chains 11 of the thermoforming packaging machine 1, which grip the lower web 8 on both sides, are each guided in a chain guide 13. These chain guides 13 are each protected from the outside by a side panel 14 of the thermoforming packaging machine 1 and, if necessary, fastened to the side panel 14. The side paneling 14 can be a sheet metal part.

The thermoforming packaging machine 1 furthermore has a control system 19. This has the task of controlling and monitoring the processes running in the thermoforming packaging machine 1. A display device 20 with operating elements 21 is used to visualize or influence the process sequences in the thermoforming packaging machine 1 for or by an operator.

FIGS. 2A to 2D show a cutting device 15 belonging to the transverse cutting device 4 of FIG. 1.

Figure 2A:
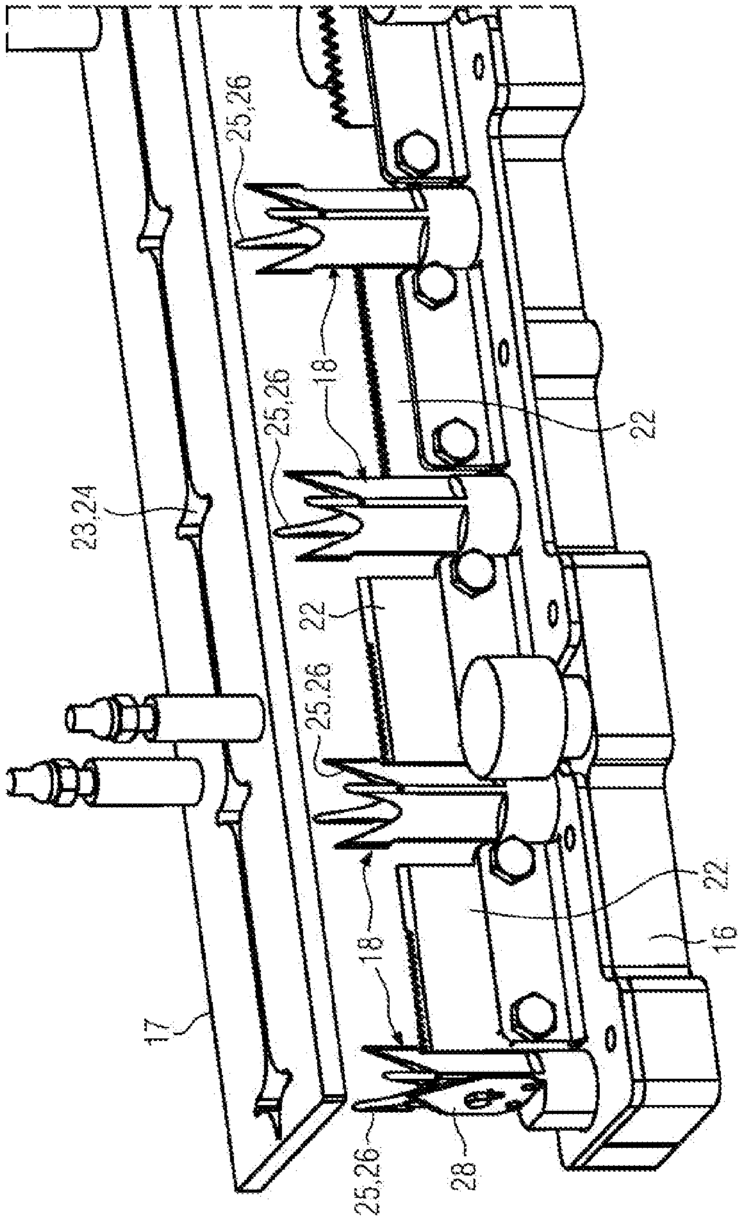
FIGS. 2A to 2D show a cutting device according to the disclosure during various operating phases.

The cutting device 15 comprises a cutting tool 16 and a hold-down device 17 positioned above it. FIG. 2A shows the cutting device 15 in an open position. The cutting tool 16 and/or the hold-down device 17 are mounted in a height-adjustable manner. According to FIG. 2*a*, the cutting tool 16 has several spaced-apart cutting punches 18. The respective cutting punches 18 are adapted for cutting round packaging corners from the film web F.

In FIG. 2A, cutting knives 22 are mounted between the respective cutting punches 18. The cutting knives 22 can cut the film web F in a direction transverse to the transport direction R between adjacent troughs.

Corresponding to a horizontally projected geometry of the cutting punches 18 and the cutting knives 22 positioned between them, the hold-down device 17 has a corresponding die 23. According to FIG. 2A, the die 23 is equipped with star-shaped openings 24 as piercing openings for the cutting punches 18, into which, as shown in FIGS. 2B to 2D, the cutting punches 18 can immerse in order to produce round packaging corners in the web F.

The cutting punches 18 mounted on the cutting tool 16 in FIG. 2A each have a cutting edge 25 which forms a cutting contour 26 extending both transversely and longitudinally along the cutting punch 18. The cutting contour 26 is thus three-dimensional with respect to a cutting plane E (see FIG. 3A) in which the film web F is guided.

How the cutting punches 18 and the cutting knives 22 positioned therebetween cooperate with the die 23 formed within the hold-down device 17 is illustrated with reference to FIGS. 2B to 2D.

Figure 2B:
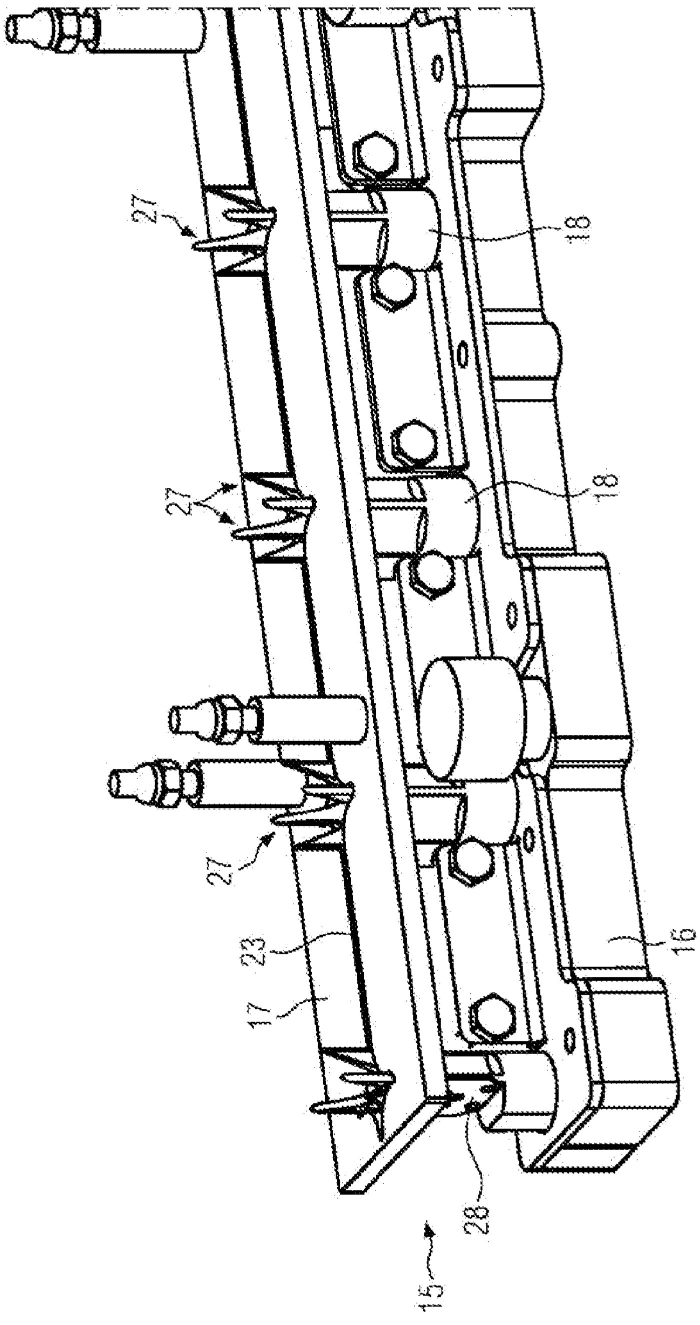
Figure 2C:
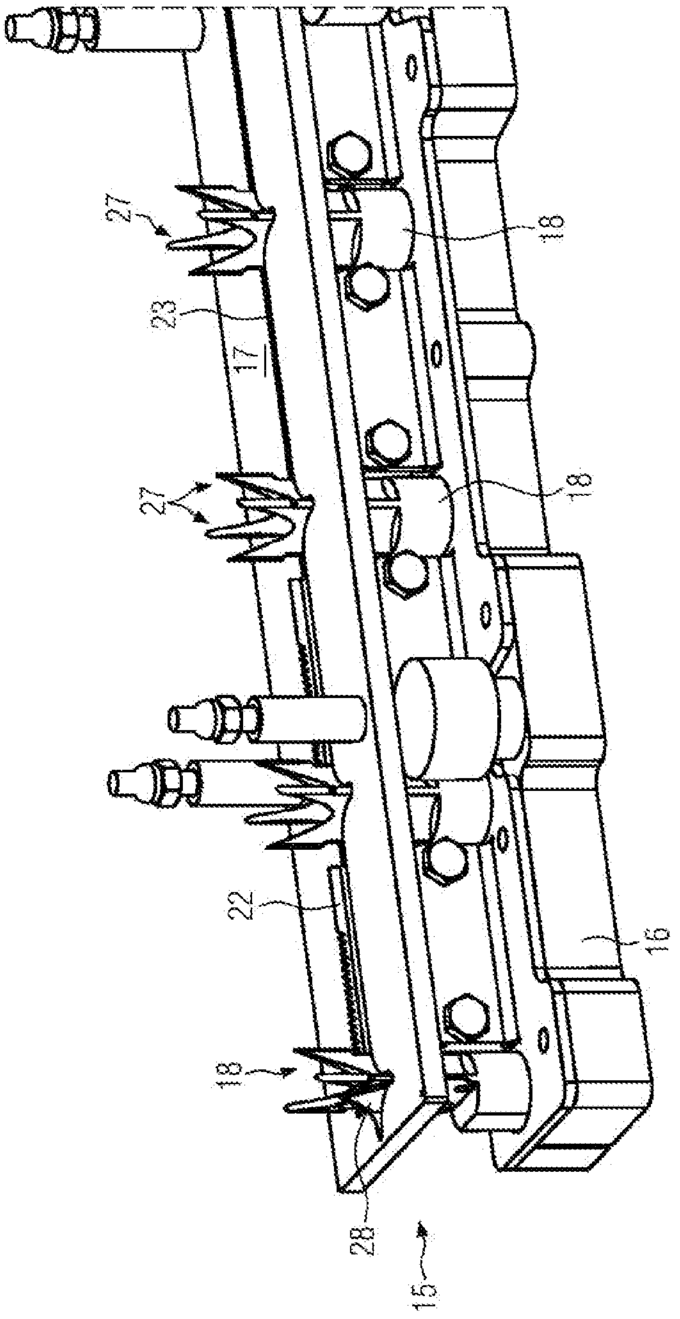
Figure 2D:
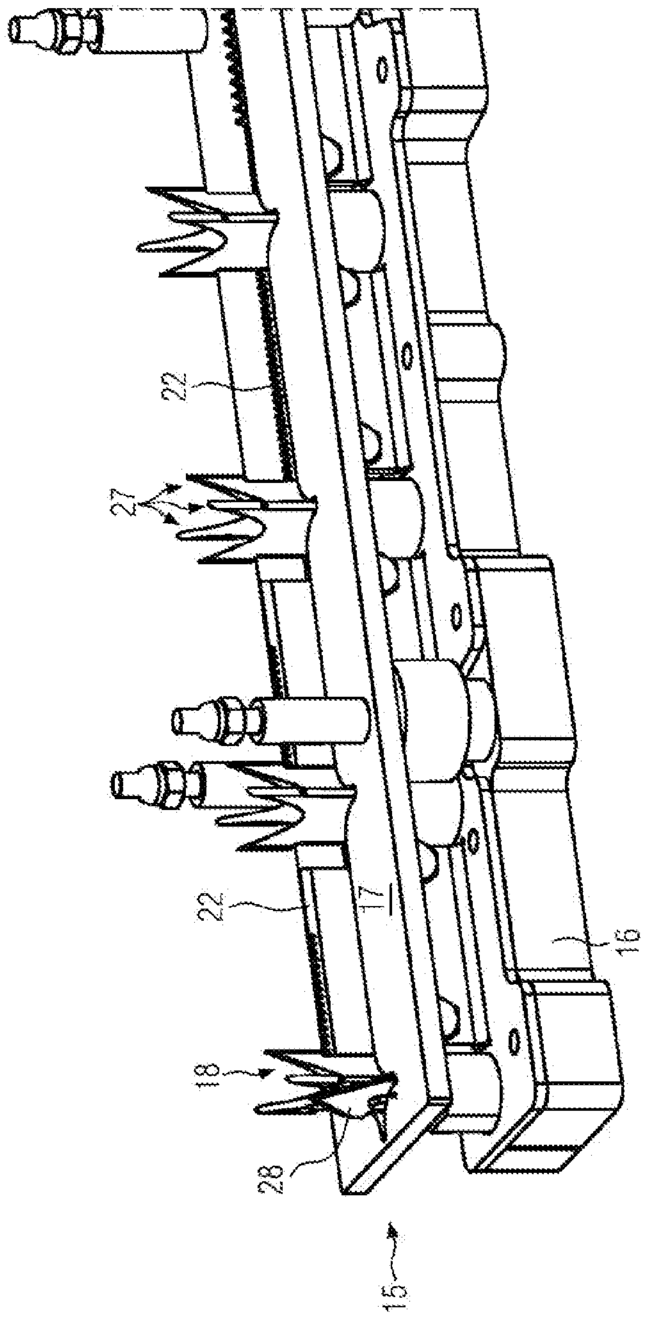

FIG. 2B shows that tips 27 formed on the respective cutting punches 18 first dip into the die 23 formed on the hold-down device 17 when the cutting device 15 closes. This ensures that the entire cutting edge 25 does not penetrate the film web F at once during the cutting process (see FIG. 3A), but that the tips 27 are to a certain extent first punctured into the film web F. In the process, the tips 27 cut through the film web F further and further with increasing penetration depth until a complete star-shaped cutout (see FIG. 3G) is produced. Because the tips 27 of the respective cutting punches 18 penetrate into the film web F with increasing penetration depth, i.e., with increasing cross-section, the respective cutting edge 25 of the cutting punches 18 can cut through the film web F with a reduced cutting force.

FIG. 2B also shows that, when the cutting device 15 is closed, the tips 27 of the cutting punches 18 first cut out the round packaging corners from the film web F. Subsequently, as shown in FIG. 2C, the cutting knives 22 positioned between the punches 18 immerse through the die 23 formed in the hold-down device 17, creating cross-sections between the round packaging corners already cut out.

In FIG. 2D, the cutting punches 18 and the cutting knives 22 positioned between them are maximally dipped into the die 23 in the hold-down device 17 so that a complete cutout in the film web F is achieved.

The outer cutting punches 18 shown on the cutting tool 16 in FIGS. 2A to 2D have a blade 28 by means of which the film web F can be cut on its outsides.

FIGS. 2A to 2D show that the respective cutting punch 18 has a dome-like cutting head. This allows the cutting punch 18 to penetrate the film web F with the tips 27 in front with little force, resulting in a cutting path that is drawn into the film web F. This results in low stresses forming within the film F during the cutting process, which enables a more precise cutout of the film.

FIGS. 3A to 3G show how the cutting punch 18 penetrates further and further into the film web F with its cutting edge 25 as the penetration depth increases. The film web F is positioned within the cutting plane E in FIG. 3A. In this cutting plane E, the film web F is held between the cutting tool 16 and the hold-down device 17 positioned above it for the cutting process.

Figure 3A:
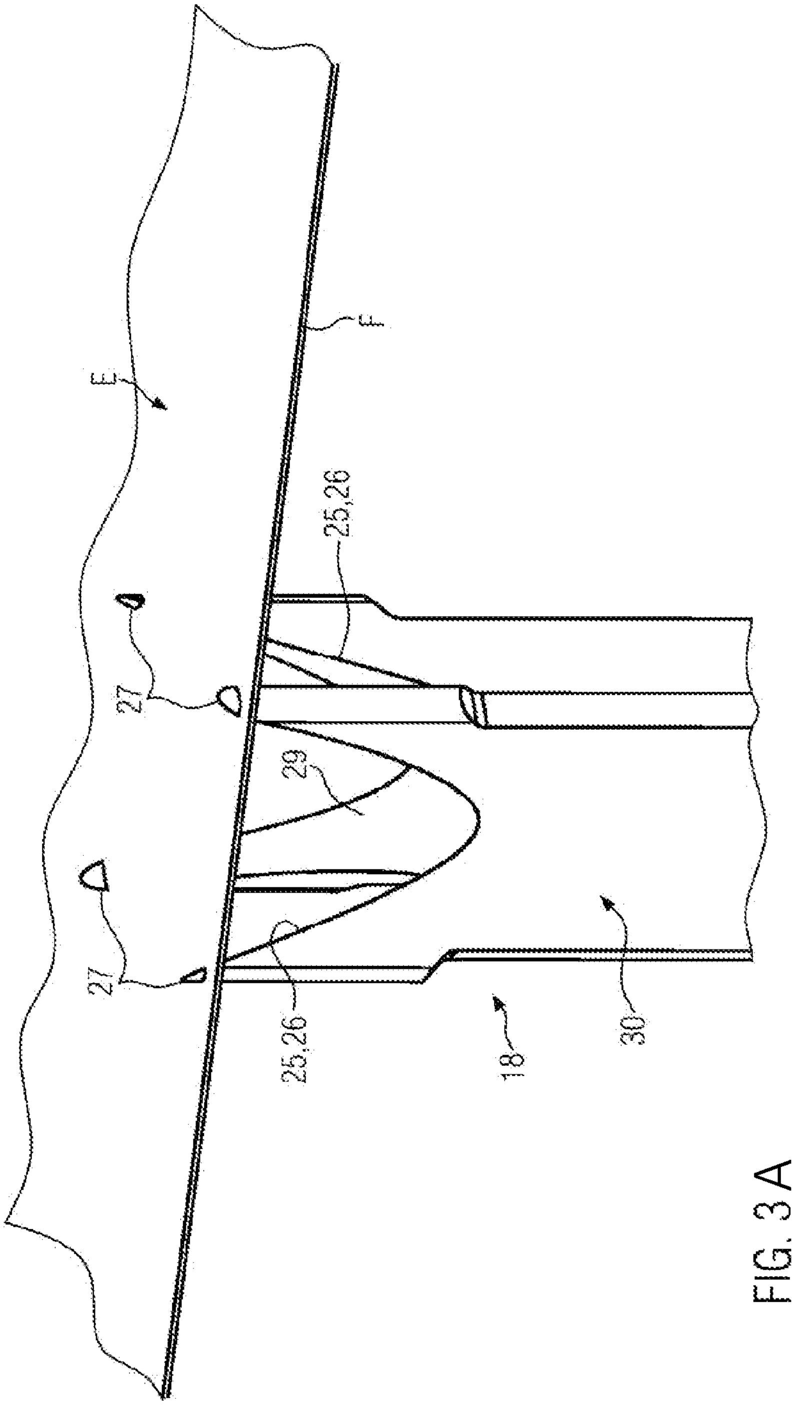
FIGS. 3A to 3G show a cutting punch of the cutting device according to the disclosure during cutting of a film web.

FIG. 3A shows that the cutting punch 18 already punctures the film web F with its tips 27. The tips 27 can penetrate the film web F with comparatively little force. FIG. 3A shows that the cutting edge 25 of the cutting punch 18 between the tips 27 is for the most part still positioned below the film web F. With increasing penetration of the cutting punch 18 into the film web F, the cutting edge 25 cuts through the film web F more and more, resulting in a complete cutout. This is shown in FIGS. 3B to 3G.

A depression 29 is formed in the cutting punch 18 of FIG. 3A. Together with a concavity 30 formed on the circumference of the cutting punch 18, the depression 29 forms the curved cutting edge 25.

According to FIG. 3A, the depression 29 is cone-shaped. A conical milling tool could be used to produce the depression 29 so that the depression 29 is at least partially in the form of a truncated cone with respect to a longitudinal axis of the cutting punch 18.

The concavities 30 formed on the outside of the cutting punch 18 in FIG. 3A together with the depression 29 form a dome-like cutting head whose tips 27 penetrate the film web F like knife tips during the cutting process. The concavities 30 can be produced by means of a cylindrical milling tool.

Figure 3B:
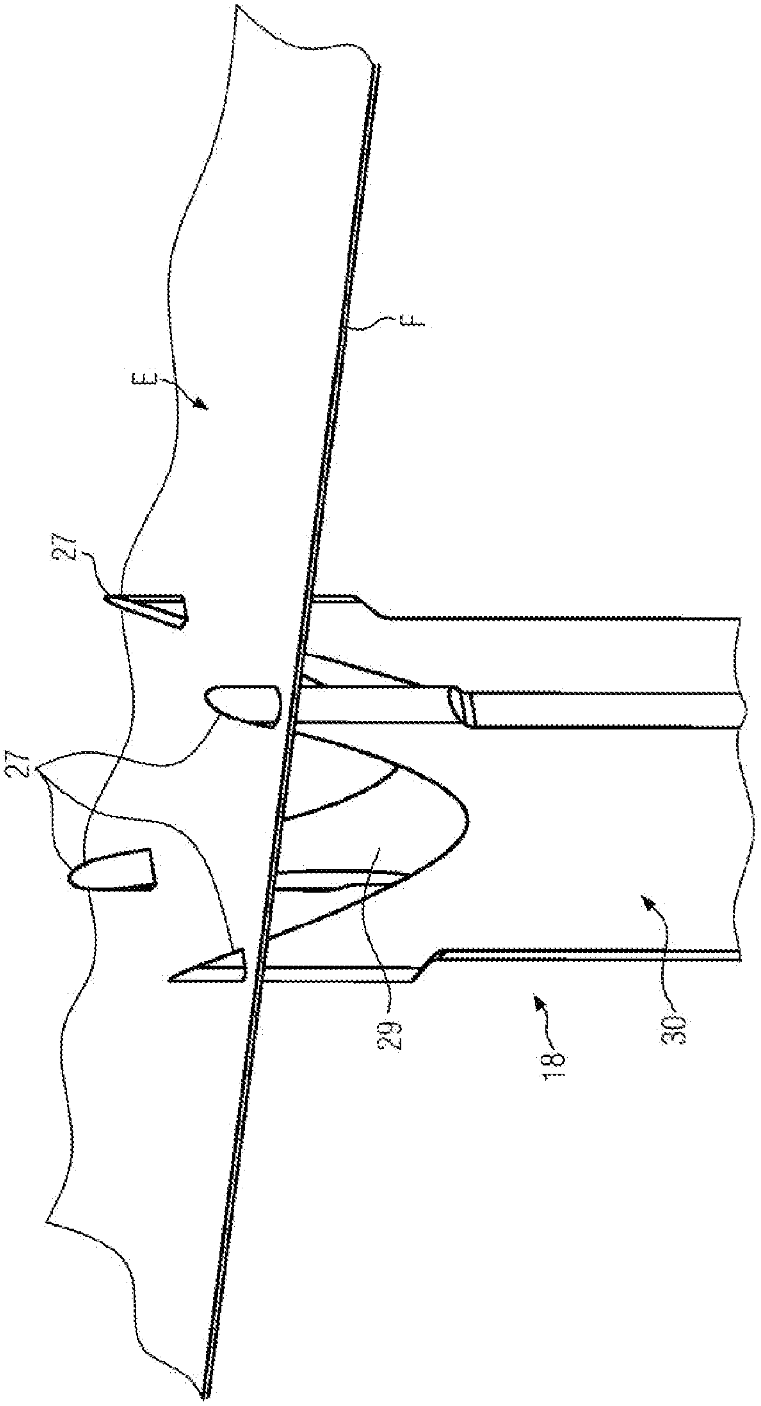
Figure 3C:
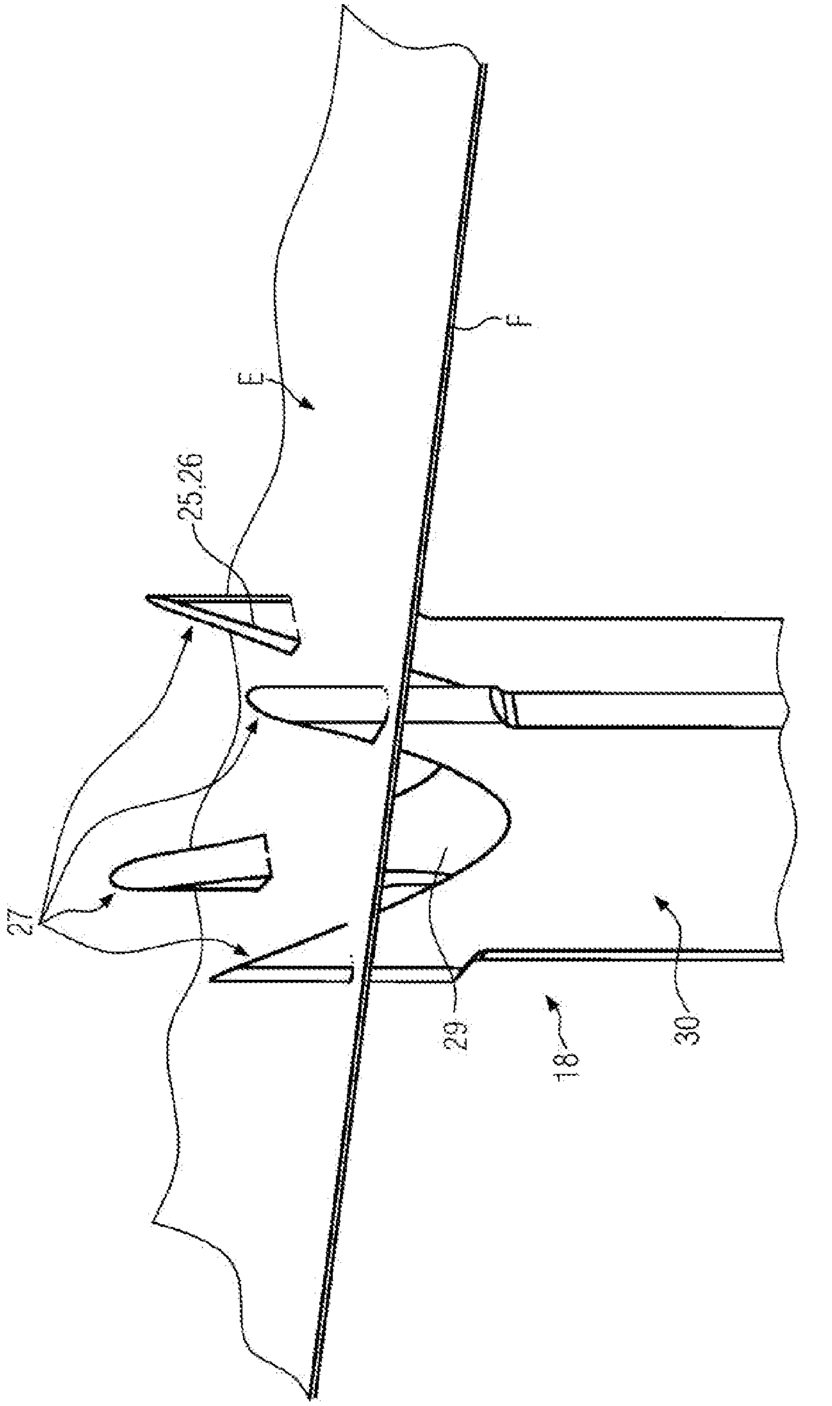
Figure 3D:
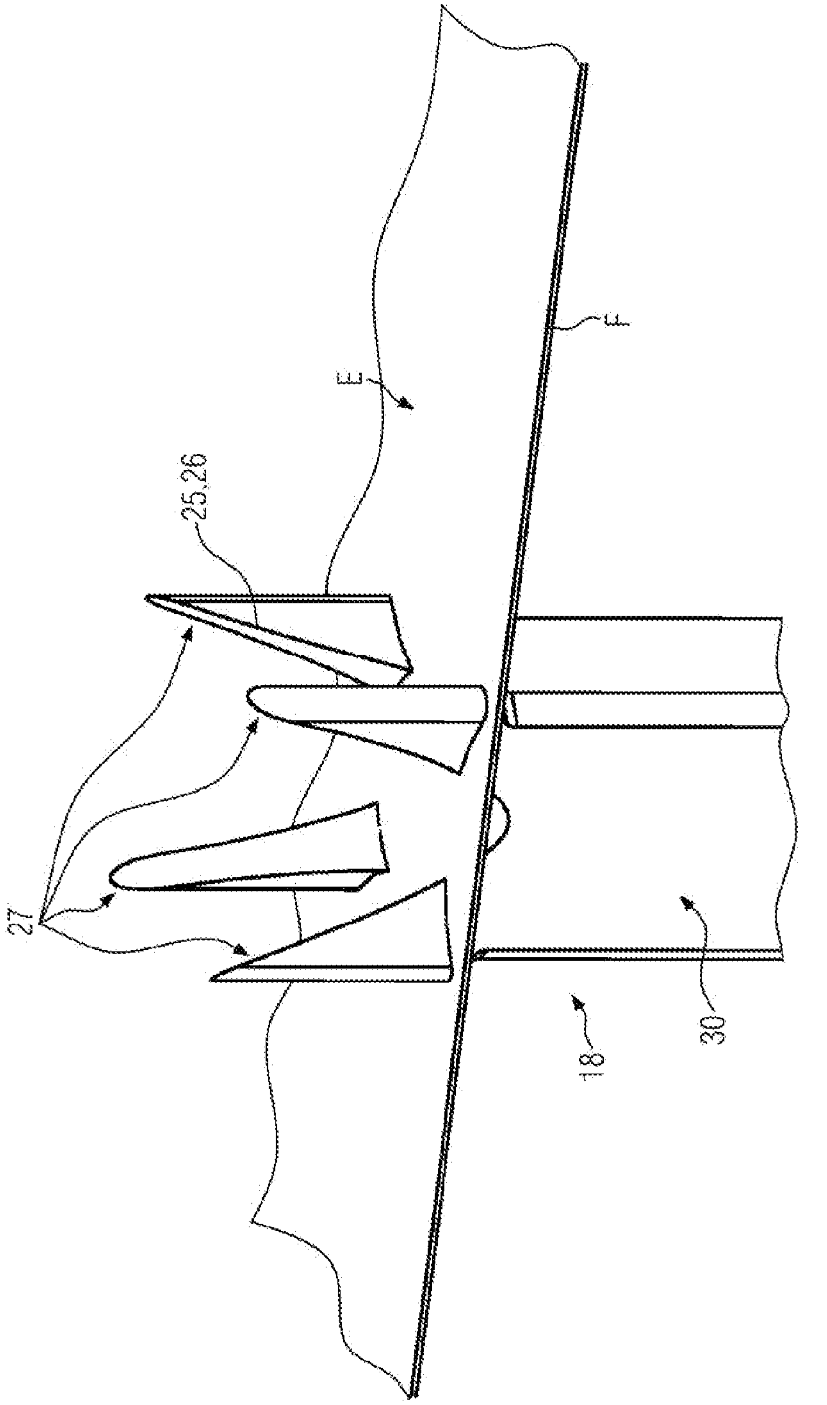
Figure 3E:
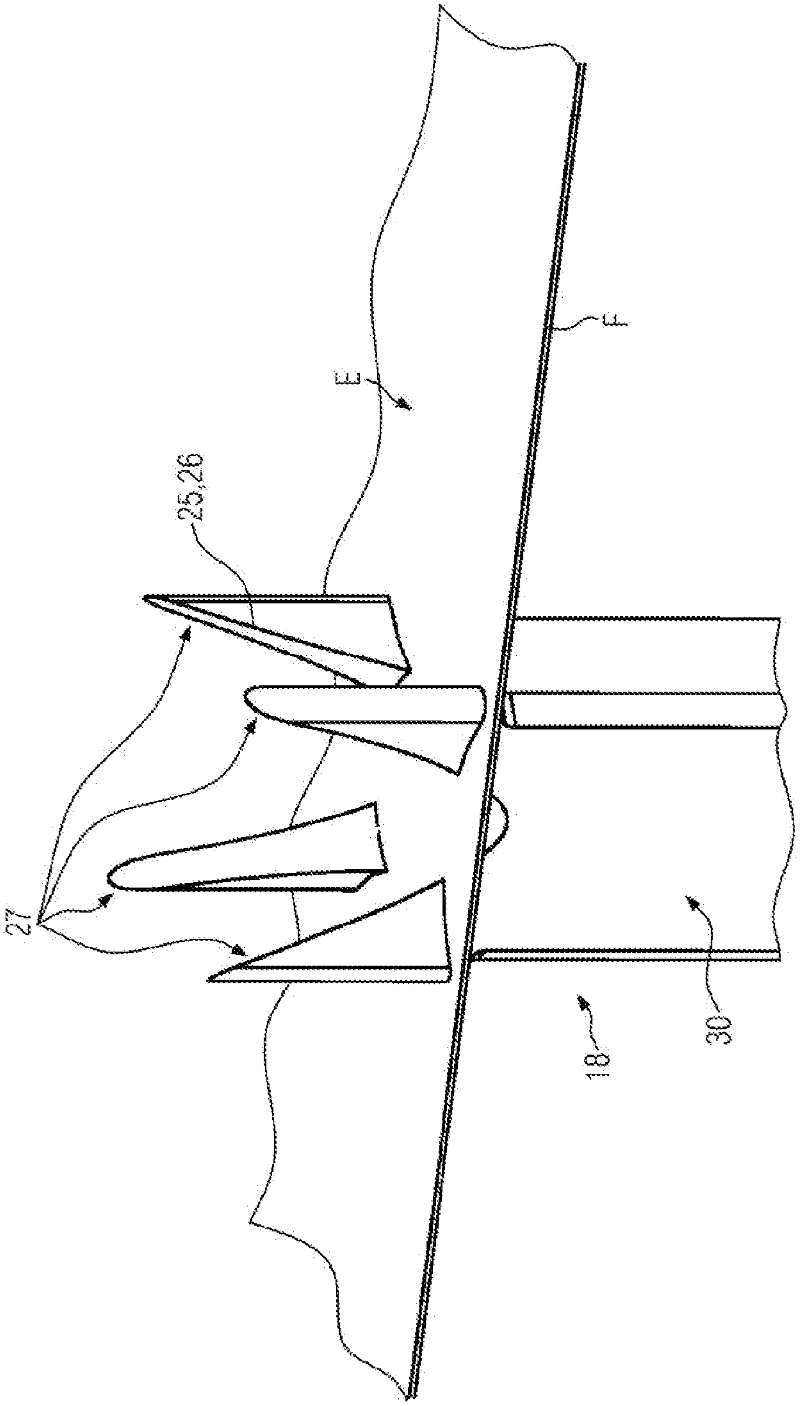
Figure 3F:
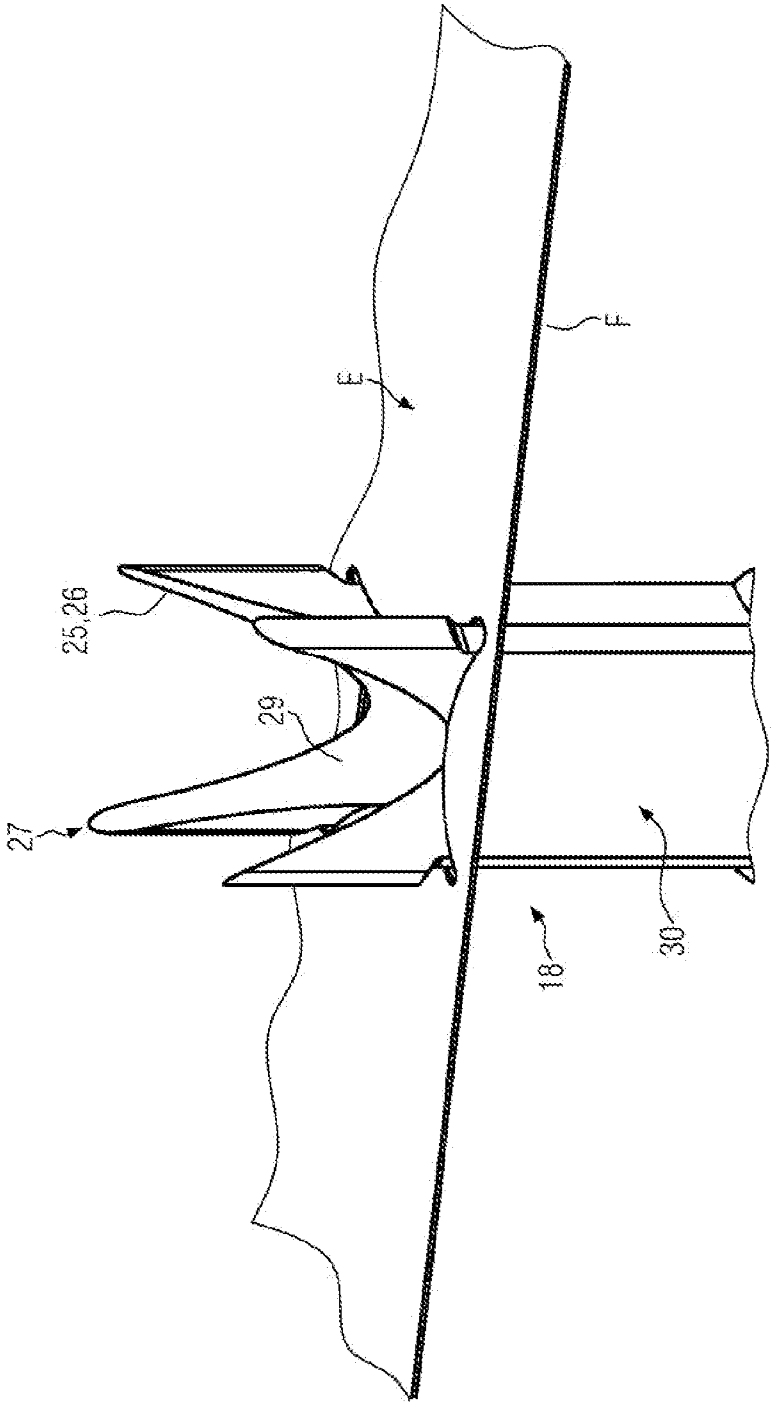
Figure 3G:
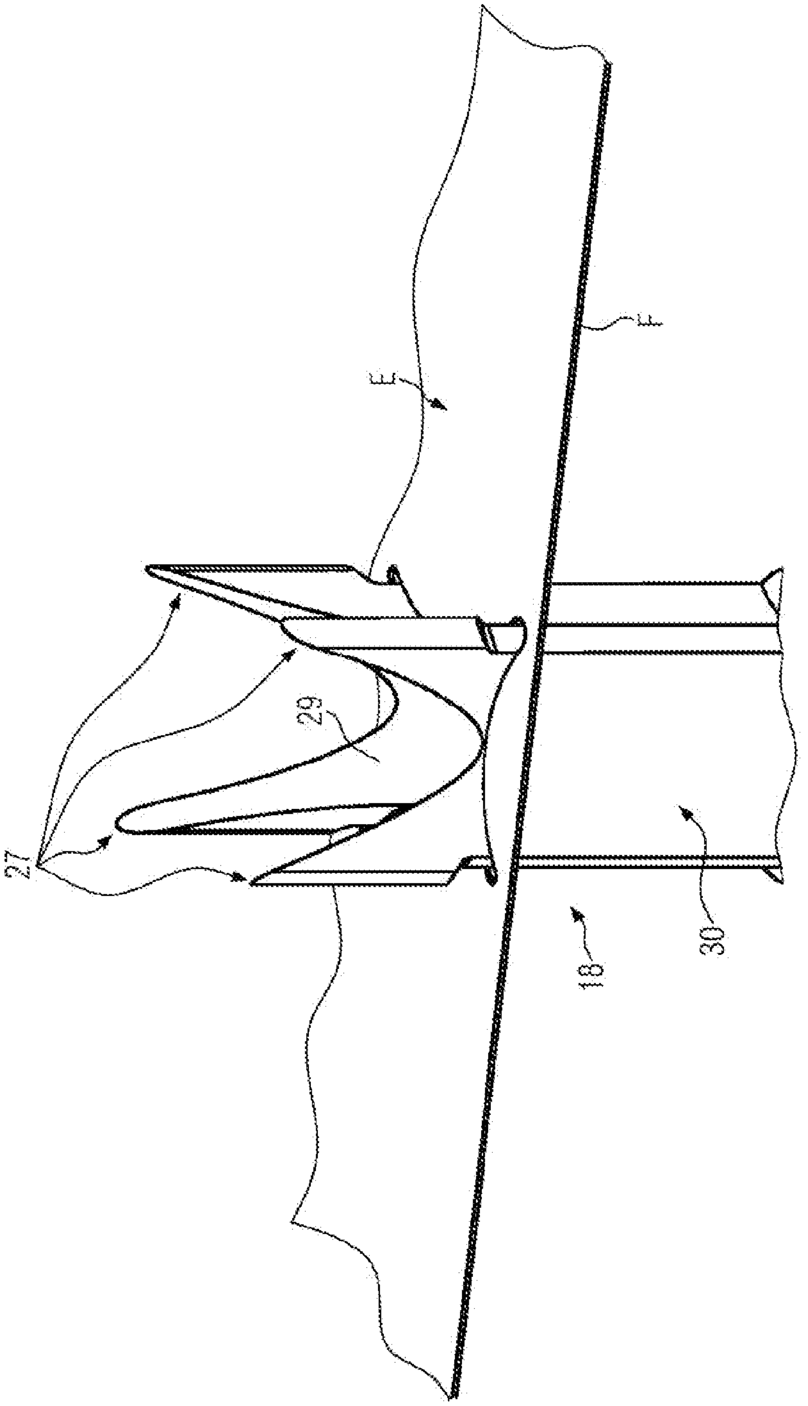

FIG. 3B shows the tips 27 with increasing penetration depth compared to FIG. 3*a*. In view of FIGS. 3A to 3G, it is shown that the cutting edge 25 increasingly cuts through the film web F as the cutting punch 18 moves into the die 23 (see FIGS. 2A to 2D). The cutting edge 25, which is increasingly pulled through the film web F, is thus pulled through the film web F like a knife until, as shown in FIG. 3G, the tips 27 are positioned completely above the film web F, whereby the round packaging corners are completely cut out.

Figure 4:
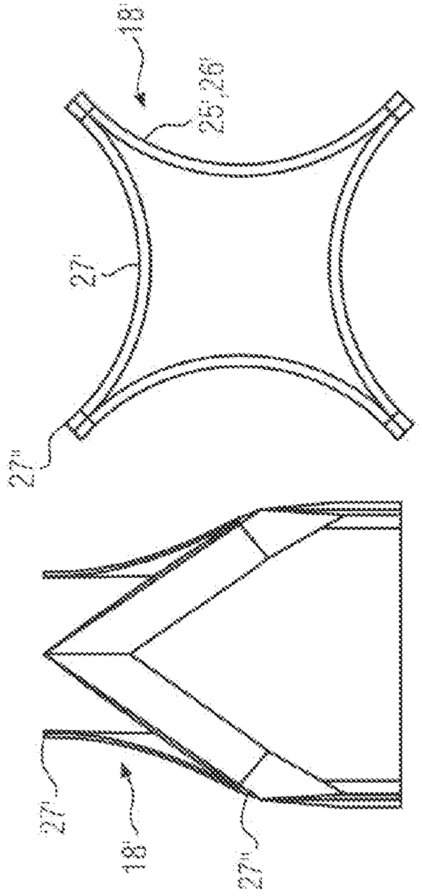
FIG. 4 shows a cutting punch with a three-dimensional cutting contour according to a variant.

FIG. 4 shows a cutting punch 18' according to the embodiment in various views. The cutting punch 18' of FIG. 4 has a cutting edge 25' providing tips 27' formed in longitudinal extension of the cutting punch 18', which are located between tips 27" formed in transverse extension of the cutting punch 18'. Seen in a horizontal projection plane, the cutting punch 18' thus has the star shape shown in FIG. 4, i.e., a star-shaped cutting line course, as can also be produced by means of the cutting punch 18 shown in FIGS. 3A to 3G.

The cutting punch 18, 18' used in the disclosure has a cutting edge 25, 25' with a three-dimensional cutting contour 26, 26', by means of which a cutting path can be produced which gradually moves with increasing penetration depth so that the transverse cutting device 4 can operate under comparatively low cutting forces in order to produce round packaging corners. The three-dimensional, curved cutting contour 26, 26' can be used to prevent the film cutouts produced from folding away, so that an overall precise cutout is achieved. The production of a cutting punch 18, 18' used on the cutting device 15 according to the disclosure is possible at low cost by means of a milling machine with single-axis operation. The cutting punches 18, 18' according to the disclosure improve a precise separation of packages from the film web F, can be manufactured economically as such and enable an efficient operation of the transverse cutting device 4.

What is claimed is:

1. A cutting device adapted for cutting substantially round packaging corners from a film web, the cutting device having at least one cutting tool comprising a cutting punch with a body that extends along a longitudinal axis, the body having at least one concavity with respect to the longitudinal axis on a circumference of the cutting punch, wherein an inner surface of the body of the cutting punch has at least one cone-shaped depression which is formed with respect to the longitudinal axis of the cutting punch and superimposed with the at least one concavity forming a contoured cutting edge extending three-dimensionally along the body of the cutting punch.

2. The cutting device according to claim 1, wherein the cutting edge projected in a cutting plane at least partially has a star-shaped cutting contour.

3. The cutting device according to claim 1, wherein the cutting punch has a plurality of tips which are configured both in transverse and in longitudinal extension of the cutting punch.

4. The cutting device according to claim 3, wherein along the cutting contour of the cutting edge the tips formed in longitudinal extension of the cutting punch converge with the tips formed in transverse extension of the cutting punch.

5. The cutting device according to claim 1, wherein the depression is at least partially in the form of a truncated cone with respect to a longitudinal axis of the cutting punch.

6. The cutting device according to claim 1, wherein the cutting punch is formed in one piece.

7. The cutting device according to claim 1, wherein the cutting punch has four concavities on the circumference.

8. A thermoforming packaging machine comprising, in a transport direction, a forming station, a sealing station, a transverse cutting station and a longitudinal cutting station, wherein the transverse cutting station comprises at least one cutting device according to claim 1.

9. A cutting device adapted for cutting substantially round packaging corners from a film web, the cutting device having at least one cutting tool comprising a cutting punch with a circumference having a plurality of concavities with respect to a longitudinal axis of the cutting punch, wherein an inner surface of the cutting punch has a cone-shaped depression extending with respect to the longitudinal axis of the cutting punch and, being superimposed with the plurality of concavities forming a cutting edge with a three-dimensional cutting contour.

10. The cutting device according to claim 9, wherein the cutting edge projected in a cutting plane at least partially has a star-shaped cutting contour.

11. The cutting device according to claim 9, wherein the cutting punch has a plurality of tips which are configured both in transverse and in longitudinal extension of the cutting punch.

12. The cutting device according to claim 11, wherein along the cutting contour of the cutting edge the tips formed in longitudinal extension of the cutting punch converge with the tips formed in transverse extension of the cutting punch.

* * * * *